(12) United States Patent
Vasudevan

(10) Patent No.: US 7,479,180 B2
(45) Date of Patent: Jan. 20, 2009

(54) INKJET INKS WITH IMPROVED BLEED PERFORMANCE

(75) Inventor: Sundar Vasudevan, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 285 days.

(21) Appl. No.: 11/412,573

(22) Filed: Apr. 27, 2006

(65) Prior Publication Data

US 2007/0252880 A1    Nov. 1, 2007

(51) Int. Cl.
    *C09D 11/00*    (2006.01)
(52) U.S. Cl. .................................................. 106/31.6
(58) Field of Classification Search .................. 106/31.6
    See application file for complete search history.

(56) References Cited

U.S. PATENT DOCUMENTS

| 5,750,594 A |   | 5/1998  | Page et al. |
|---|---|---|---|
| 5,785,743 A |   | 7/1998  | Adamic et al. |
| 5,853,465 A |   | 12/1998 | Tsang et al. |
| 6,022,908 A | * | 2/2000  | Ma et al. ..................... 523/160 |
| 6,036,759 A | * | 3/2000  | Wickramanayake et al. ..... 106/31.28 |
| 6,221,143 B1 |  | 4/2001  | Palumbo |
| 2004/0168608 A1 | * | 9/2004  | Bauer et al. .............. 106/31.27 |
| 2004/0233263 A1 | * | 11/2004 | Goto et al. .................. 347/100 |

* cited by examiner

*Primary Examiner*—J. A. Lorengo
*Assistant Examiner*—Veronica Faison Gee

(57) ABSTRACT

Inkjet ink formulations, and ink sets and methods using the same, with improved performance, wherein the inks are formulated to work as an ink set having different polarities.

27 Claims, 5 Drawing Sheets

INKJET INKS WITH IMPROVED BLEED PERFORMANCE

FIELD OF THE INVENTION

The present invention relates to ink-jet inks employed in ink-jet printing, and more particularly, to inks and methods using the same for improving bleed performance.

BACKGROUND OF THE INVENTION

The use of digital image-forming apparatuses such as, for example, thermal ink-jet printers, large-format plotters, piezo-electric printers, large form plotters, laser printers, silver halide grade photo imaging apparatuses, and others has grown in recent years. The growth may be attributed to substantial improvements in print resolution and overall print quality coupled with appreciable reduction in cost, and ease of use. Today's image-forming apparatuses offer acceptable print quality for many commercial, business and household applications at costs lower than those offered in the past.

One of the challenges in inkjet printing is minimizing or controlling of bleed. Many inkjet inks, when printed in various colors on media (e.g., bond paper, copier paper), can lead to bleed. The term "bleed," as used herein, is defined as the invasion of one color into another, once the ink is deposited on the print medium, as evidenced by a ragged border therebetween. Bleed occurs as colors mix either on the surface of the print medium (e.g., paper), within the print medium itself, within the deposited ink layer, or any combination of the preceding. The occurrence of bleed is particularly problematic between a darker ink (such as black ink) and an adjacently-printed lighter ink (such as yellow) because it is all the more visible.

To achieve improved bleed control, various approaches have been used. Prior solutions to reduce bleed have largely involved the use of heated platens or other heat sources and/or special paper. Heated platens add cost to the printer. Special paper limits the user to a single paper, which is of a higher cost than a "plain" paper. Other approaches have included increasing the penetration rate of the ink into the paper with the possible tradeoff of reduced edge acuity and/or color saturation, and/or the addition of a various additives to one or more inks. However, these additives typically have a deleterious effect on print quality and/or pen reliability, such as capped storage, kogation, decap, and waterfastness; as well as increased cost in custom designing inks within an ink set.

It would be desirable to provide printing inks for use in ink jet printers with improved bleed control, while allowing for greater flexibility in selection of the colorants.

SUMMARY

The present invention is directed to inkjet inks and method using the same.

The inks of the present invention are formulated to work as part of an inkjet ink set. The inks comprise an aqueous vehicle; a first pigmented colorant dispersed in the first ink and having a pre-determined first polarity; and a second pigmented colorant being different than the first colorant and dispersed in the second ink and having a pre-determined second polarity opposite that of the first polarity of the first ink; wherein at least one of the colorants of either the first or the second ink is substantially achromatic and the other is substantially chromatic.

DETAILED DESCRIPTION OF EMBODIMENTS OF THE INVENTION

Figure 1A:
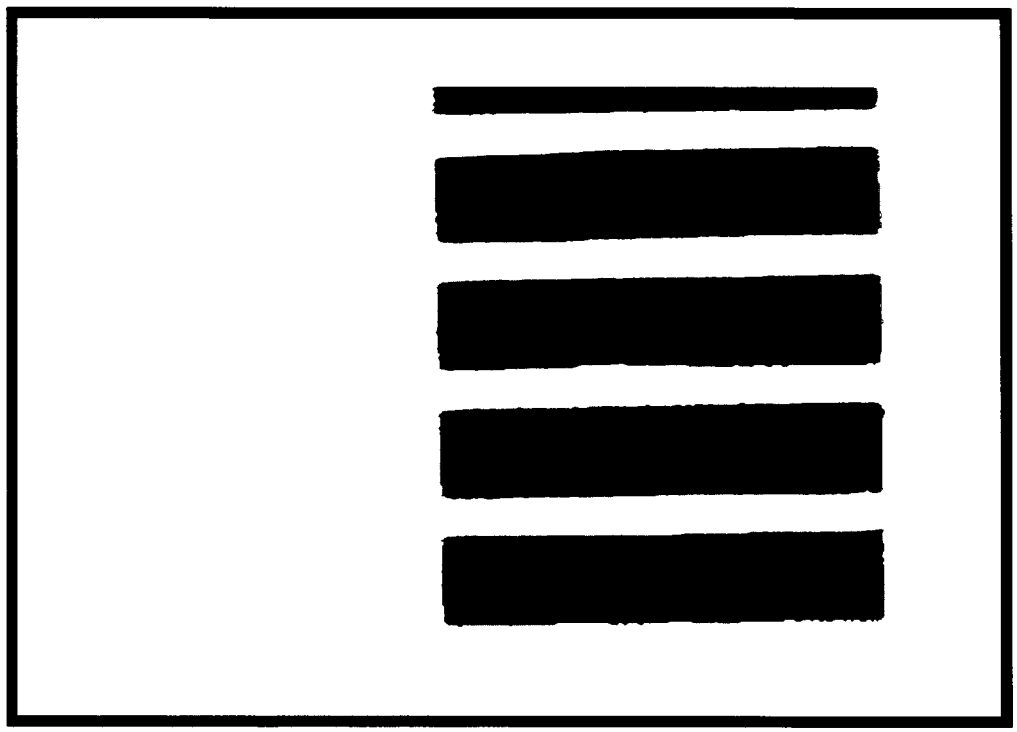
FIGS. 1A and 1B are representative print samples illustrating different bleed performances.

The present invention is directed to printing inks. In an embodiment the printing inks are usable in inkjet printing (e.g. either or both piezoelectric and thermal inkjet apparatus) using commercially available printers such as the DESKJET®, DESIGNJET®, and PHOTOSMART® families of printers; manufactured by Hewlett-Packard Company of Delaware. The inks of the present invention are particularly useful for imaging and photo printers, including commercial printers. The inks of the present invention are useful for printing on porous, non-porous, and hybrid glossy media and semi-glossy media, and plain paper. Exemplary print media include, but are not limited to, Hewlett-Packard Advanced glossy Photo Paper, Iford Galerie Pearl Photo Inkjet Paper (semi-gloss), Epson Premium Glossy Photo Paper, Pictorico Photo Gallery glossy paper, Gilbert Bond, Champion Data Copy.

The present approach provides for a more economical and manageable design and manufacturability approach to formulating pigmented inks for use with one another (e.g., black and color inks) for controlling or minimizing bleed (e.g., black to color bleed) among the pigmented inks for use in a given system.

The inks according to the present invention include a colorant dispersed in a vehicle. In an embodiment, the colorant is a dispersed pigment. As used herein, the term "dispersed" shall mean any mechanism by which a component, such as the colorant, is stabilized in the vehicle either by way of self-stabilization or through the use of a dispersing aid. In an embodiment, the inks are made up, or are formulated for use as an ink set. In an embodiment, the ink set comprises a plurality of inks including a first and a second ink, each ink comprising an aqueous vehicle. In an embodiment, the inks are configured to make up an ink set including black ink and at least one color ink (i.e., not black). In an embodiment, the ink set includes at least one of each of black, cyan, magenta, and yellow inks.

The inks of the present invention enable printing at high throughput rates while providing printed images having a high print quality, by reducing or minimizing visible bleed (bleed which is visible to the human eye) from one ink printed onto a medium into another ink color printed adjacent thereto. The term "bleed," as used herein, is defined as the invasion of one color into another, once the ink is deposited on the print medium, as evidenced by a ragged border therebetween. Bleed occurs as colors mix either on the surface of the print medium (e.g., paper), within the print medium itself, within the deposited ink layer, or any combination of the preceding. The occurrence of bleed is particularly problematic between a darker ink (such as black ink) and an adjacently-printed lighter ink (such as yellow) because it is all the more visible. Hence, to achieve good print quality, bleed must be substantially reduced or eliminated such that borders between colors are clean and substantially free from the invasion of one color into the other. Visible bleed may be reduced by either or both reducing actual bleed when there is in fact bleed from one ink color printed on a medium into another ink color printed adjacent thereto; as well as when such bleed, even though present, is not readily discernable by the naked eye.

In an embodiment, the enhanced bleed performance is achieved by employing self-dispersing pigments wherein the dispersion is achieved through surface modification of the pigment. The self-dispersing pigment, may have a "first charge" (or polarity) which is positive or negative. As used herein, the term "first charge" refers to the ionic charge (anionic or cationic) of the dispersed pigmented ink as originally formulated.

In an embodiment, the black pigment employed in the black ink is a self-dispersing anionic pigment. Such anionic pigments suitable for use herein include all chemically modified water-dispersible, anionic black pigments known for use in ink-jet printing. These chemical modifications impart water-dispersibility to the pigment particles. Under typical chemical processes, by way of example, the resulting surfaces consist of carboxylate and/or sulfonate functionalities. As commercially available, the anionic pigments are usually associated with $Na^+$, $Li^+$, $K^+$, and $NH_4^+$ cations, although any suitable counterion may be used herein. Many of suitable water-dispersible black pigments are commercially available from colorant vendors such as Cabot Corp. (under the trade name CAB-O-JET®) and Orient Chemical. See U.S. Pat. Nos. 5,630,868 and 5,571,311 for a discussion of modified carbon pigments.

In another embodiment the pigment may be dispersed in the ink vehicle with the aid of a dispersing agent. Examples of such pigments include black (i.e., substantially achromatic) pigments dispersed with a dispersant (e.g., having an anionic functionality), for example, the Joncryl® polymers available from S. C. Johnson Polymer (Racine, Wis.). Of course, any other dispersant exhibiting anionic or cationic charges may be employed in the practice of this invention.

The color inks (i.e., substantially chromatic) according to the present invention comprise at least one colorant, typically a dispersed pigments. The dispersed color pigment, similarly, as originally formulated, may have a first charge which is either cationic or anionic. Any of the color pigments known for use in ink-jet printing may be employed in the practice of this invention.

Without intending to limit the scope of the usable color pigments, the following exemplary color pigments are useful in the practice of this invention: Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140—available from BASF; Monarch® 1400, Monarch® 1300, Monarch® 1100, Monarchs 1000, Monarch® 900, Monarch® 880, Monarch® 800, and Monarch® 700—available from Cabot: Corp.; Chromophtal® Yellow 3G, Chromophtal® Yellow GR, Chromophta® Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B—available from Ciba-Geigy; Printex U, Printex V, Printex 140U, and Printex 140V—available from Degussa; Tipure® R-101—available from DuPont; Dalamar® Yellow YT-858-D and Heucophthal® Blue G XBT-583D—available from Heubach; Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B—available from Hoechst; Quindo® Magenta, Indofast® Brilliant Scarlet, Quindo® Red R6700, Quindo® Red R6713, and Indofast® Violet—available from Mobay; and L74-1357 Yellow, L75-1331 Yellow, and L75-2577 Yellow—available from Sun Chem.

In an embodiment, the inks according to the present invention are formulated, to work together as a set (black as well as the at least one pigmented color ink). The dispersed colorants (i.e., pigments stabilized either by way of self-stabilization or through the aid of a dispersing aid) of the set, as initially formulated, are stabilized by a first charge (e.g., anionic or cationic) which are similar to one another. In other words, for example, if the black pigmented ink is stabilized by a first charge, (e.g., anionic charge), the pigmented colorant for the at least one or more color inks is also stabilized by an anionic charge. In the alternative, if the black pigmented ink is stabilized by positive charges, so is the pigmented colorant for the at least one or more color ink. Thus, the pigmented black and pigmented one or more color inks are be stabilized by similar type of first charges (i.e., anionic or cationic), as initially formulated.

In an embodiment, to improve bleed performance (i.e., reduce bleed) among the black and the at least one or more color inks of the set, the polarity (or the charge) of either the black ink or the color ink is reversed by using one or more surfactants having a second charge opposite that of the first charge of the selected pigmented colorant for reversing polarity.

By way of example, if both black and the pigmented color dispersions, as originally formulated, were stabilized by anionic charges (e.g., first charge is anionic), black to color bleed performance may be improved by reversing the polarity of the black ink or that of the color ink/s (but not both the black and the color inks at the same time) by using one or more appropriately selected cationic surfactant/s. In the alternative, if both the black and color pigmented dispersions, as originally formulated, were stabilized by cationic charges (e.g., first charge is cationic), bleed performance may be improved by reversing the polarity of the black or that of the color ink/s, to a second charge (e.g., anionic), by using one or more appropriately selected anionic surfactants.

It is typically presumed that if surfactant of opposite polarity is added to a colloidal dispersion (e.g., a pigmented ink wherein the first charge is opposite that of the surfactant), it would lead to coagulation. That is, at sufficient surfactant concentration, the zeta potential of the system approaches zero, leading to the loss of colloidal stability and resulting in coagulation. This phenomenon is exploited in applications where coagulation is desired, such as in waste water treatment.

However, according to the present invention, when sufficient amount of surfactant having polarity or charge opposite that of the first charge of the dispersed pigment of the selected ink, is added to the formulation, after the initial approach of the zeta potential to zero, the zeta potential departs from zero in a direction opposite that of the initial polarity (or the first charge), thus leading to reversing the polarity of the formulation, at which time, the colloidal system is again stabilized, at a second charge (opposite that of the first charge).

In either alternative (first charge being anionic and the surfactant being cationic, or the opposite where the first charge is cationic and the surfactant is anionic), the minimum amount of surfactant sufficient to reverse the polarity of the selected ink may be determined by performing zeta potential titration.

The surfactants which may be employed in reversing the polarity of the pigmented colorant, may be cationic or anionic, depending on the original first charge of the pigmented colorant, namely being opposite that of the first charge of the pigmented colorant (i.e., being of "second charge").

Examples of cationic surfactants that may suitably be used include, but are not limited to, tetradecyltrimethylammonium bromide (TTAB), cetylpyridinium chloride (CPC), cetyltrimethylammonium chloride (CTAC), polypropoxy quaternary ammonium acetates and polypropoxy quaternary ammonium chlorides. Such surfactants are commercially available from WITCO Corporation as the Emcol series. The cationic surfactant component may also comprise a mixture of appropriate cationic surfactants. Examples of counterions that may be associated with the cationic surfactant useful herein include acetate, formate, chloride, gluconate, succinate, tartrate, glutarate, malonate, carboxylate, fumarate, malate, sebacate, adipate, stearate, oleate, laurate, benzoate, and citrate. Other suitable cationic surfactants include fluorosurfactants such as those available from DuPont Corp. such as Zonyl FSD; and substituted amine oxides such as those described in U.S. Pat. No. 5,106,416, "Bleed Alleviation Using Zwitterionic Surfactants and Cationic Dyes" for a list of amine oxides. Examples of anionic surfactants that may suitably be used include, but are not limited to, sodium dodecyl sulfate (SDS), sodium lauryl sulfate, anionic surfactants available from Dupont Company under the tradename Zonyl, such as Zonyl FS62, FSA, FSE, FSJ, FSP, TBS and UR.

Optionally, one or more secondary surfactants independently may be added to the selected ink (and/or the ink which polarity is not being reversed) for purposes such as control of puddling of the ink on the inkjet printhead. (See U.S. Pat. No. 6,852,153 for examples of other surfactants that may be useful for controlling puddling). In an embodiment, suitable secondary surfactants include nonionic surfactants such as: TERGITOL® a compounds, such as TERGITOL 15-S-7, which are alkyl polyethylene oxides available from Dow Chemical (Midland, Mich.); TRITON® compounds, which are alkyl phenyl polyethylene oxide surfactants available from Rohm & Haas Co. (Philadelphia, Pa.); BRIJ® compounds available from ICI Americas (Wilmington, Del.); PLURONIC® compounds, which are polyethylene oxide/polypropylene oxide block copolymers; SURFYNOL® compounds, such as SURFYNOL CT-111, which are acetylenic polyethylene oxides available from Air Products (Allentown, Pa.); and amine oxides, such as N,N-dimethyl-N-docecyl amine oxide, N,N-dimethyl-N-tetradecyl amine oxide, N,N-dimethyl-N-hexadecyl amine oxide, N,N-dimethyl-N-octadecyl amine oxide, and N,N-dimethyl-N-(Z-9-octadecenyl)-N-amine oxide.

Each ink, independently, may include one or more compatible pigments (and optionally dyes), added thereto, for a total colorant amount generally ranging from about 0.1 to about 10%, from about 2 to about 8%, from about 4 to about 6%, by weight, based on the total weight of the ink.

Each ink, independently, may include one or more suitable surfactants according to the present invention, added thereto. The selected ink includes one or more primary surfactants in sufficient amounts to reverse the polarity of the selected ink from a first charge to a second charge. The amount of one or more primary surfactants, in total, generally ranges from about 0.01 to about 5.0%, from about 0.2 to about 2.0%, from about 0.4 to about 1.5%; by weight, based on the total weight of the ink. Optionally, the selected ink may also include one or more secondary surfactants which will not interfere with the primary surfactant, in total, as mentioned above, in an amount generally ranging from about 0.01 to about 2.5%, from about 0.05 to about 2.0%, from about 0.1 to about 1.0%; by weight, based on the total weight of the ink.

Other non-selected inks may include one or more suitable surfactants which will not adversely affect their first charge, in total, in an amount generally ranging from about 0.01 to about 2.5%, from about 0.05 to about 2.0%, from about 0.1 to about 1.0%; by weight, based on the total weight of the ink. The surfactant in the non-selected inks (e.g., inks which do not have their polarity reversed according to the present invention), may be any suitable surfactants as is commonly known in the art.

The vehicle for the ink may comprise an aqueous-based vehicle that includes water or a mixture of water and at least one water-soluble organic solvent. Selection of a suitable mixture depends on requirements of the specific application, such as desired surface tension and viscosity, the selected colorant, drying time of the liquid, and the type of substrate onto which the liquid will be printed. Representative water-soluble organic solvents that may be selected are disclosed in U.S. Pat. No. 5,085,698.

A typical ink vehicle formulation usable in formulating the inks of the present invention may include one or more solvent or co-solvents, which may be added to each ink independently, in total, in an amount generally ranging from about 1 to about 50 wt %; from about 2 to about 45 wt %, or from about 5 to about 35 wt %.

Classes of solvents or co-solvents that may be used include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, tetraethylene glycol; 2-pyrrolidinone; 1,5-pentanediol; and 2-ethyl-2-(hydroxymethyl)-1,3-propanediol.

Consistent with the invention, various types of additives, may be employed in the inks to optimize the properties of the ink compositions for specific applications. The remainder of the ink compositions is mostly water; however, other independently selected components including humectants, antikogation additives, anti-corrosive additives, polymers, preservatives, biocides that inhibit growth of microorganisms (such as the preservative PROXEL™ GXL available from Avecia Incorporated); chelating agents (or sequestering agents) such as EDTA that eliminate deleterious effects of heavy metal impurities; buffers to maintain the ink at a desired pH (such as Trizma Base, available from Sigma-Aldrich Corp. (Milwaukee, Wis.); 4-morpholine ethane sulfonic acid ("MES"); 4-morpholinepropanesulfonic acid ("MOPS"); and beta-hydroxy-4-morpholinepropane-sulfonic acid ("MOPSO")); and viscosity modifiers, may be added to improve various properties of the ink composition.

EXAMPLES

Inks were formulated and different performance attributes of the formulated inks were observed or measured in an effort to assess the benefits attained in the practice of the invention, such as, the effect of different pigments and surfactants for reversing polarity, on visible bleed while maintaining or improving the other print quality and pen performance attributes. The inks generally comprised colorant (e.g., pigmented colorant—either self-dispersed or dispersed through the aid of a dispersing agent), 2-pyrrolidinone, liponics ethoxylated glycol 1 (LEG-1), Proxel GXL, and water.

Figure 1B:
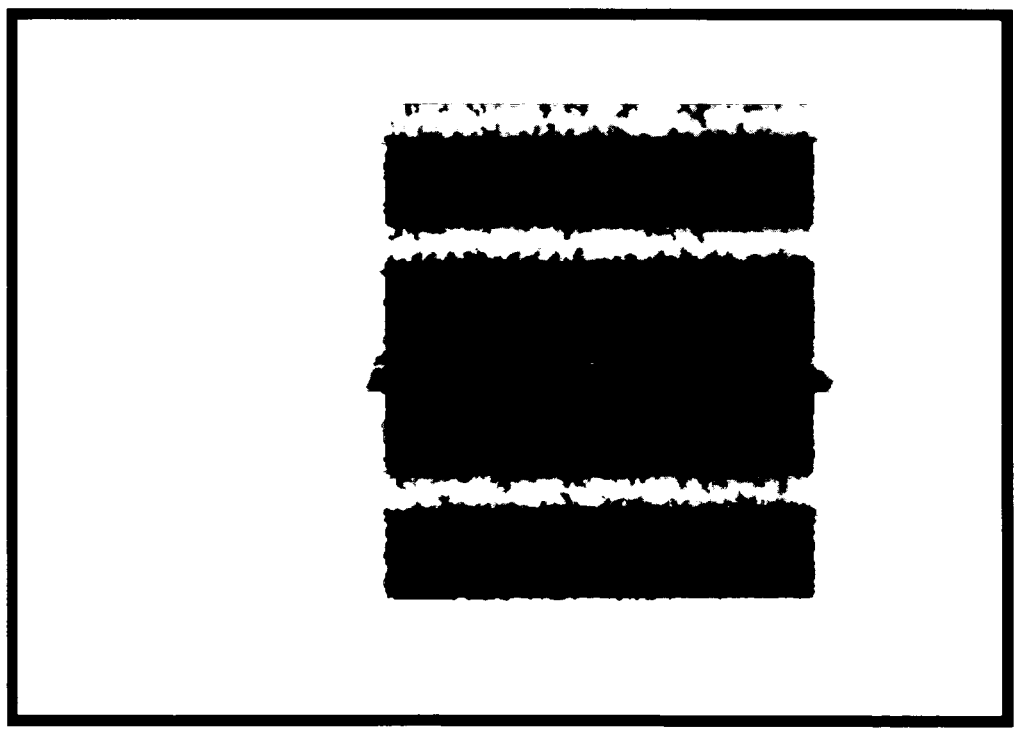

Inkjet pens were filled with the ink samples and bleed diagnostic targets were printed on a range of plain paper media such as champion data copy (CDCY) and Gilbert bond (GBND). The diagnostic prints were evaluated using a visual bleed scale ranging from 60 (poor) to 5 (very good). Exemplary black and white images of diagnostic prints representing very good and poor bleed performance are shown in FIGS. 1A and 1B.

The colorants used in the various experiments included: an anionic self-dispersed black pigment (designated as "ADBP"); and Cab-O-Jet 200 or 300, both anionically self-dispersed black pigments, herein designated as COJ200 and COJ300, respectively; Cab-O-Jet 250C, an anionically self-dispersed cyan pigment, herein designated as COJ250C; Cab-O-Jet 260M, an anionically self-dispersed magenta pigment, herein designated as COJ260M; and Cab-O-Jet 270Y, an anionically self-dispersed yellow pigment, herein designated as COJ270Y.

In one set of experiments, the anionically dispersed cyan, magenta, and yellow pigments; COJ250C, COJ260M, COJ270Y; respectively, were titrated with each of the cationic surfactants, TTAB, CPC, and CTAC. Each ink started at a relatively high negative zeta potential corresponding to the ink's first polarity (in this example, negative). As the surfactant was added to each ink, the magnitude of the initial high negative zeta potential decreased, approaching and going through zero, followed by increase in the zeta potential in a direction (here in the positive direction) opposite that of the initial ink. TTAB and CPC surfactants as used were at 20 wt % solutions with the CTAC being a 10 wt % solution.

Figure 2A:
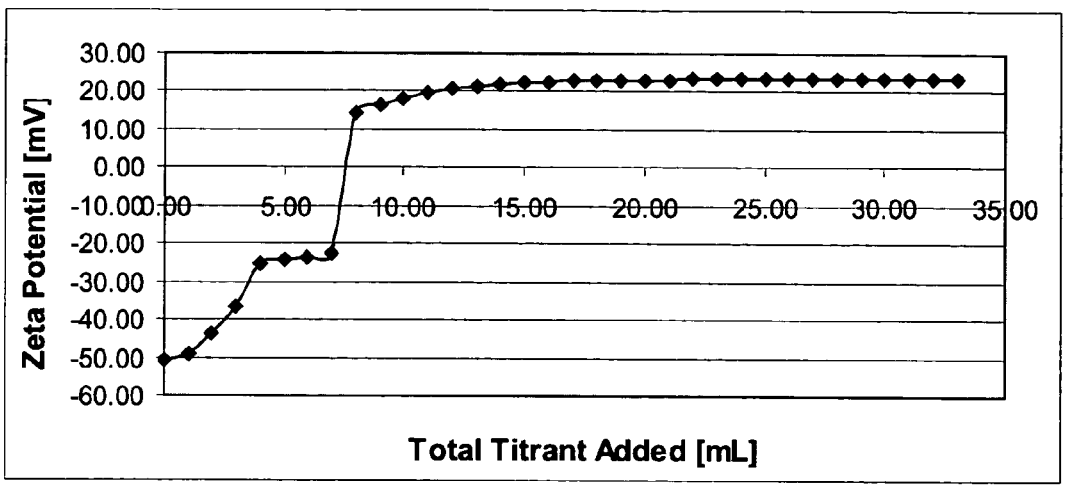
FIGS. 2A through 2C are graphical representations of the effect of various surfactants on zeta potential of various pigmented ink samples.
Figure 2B:
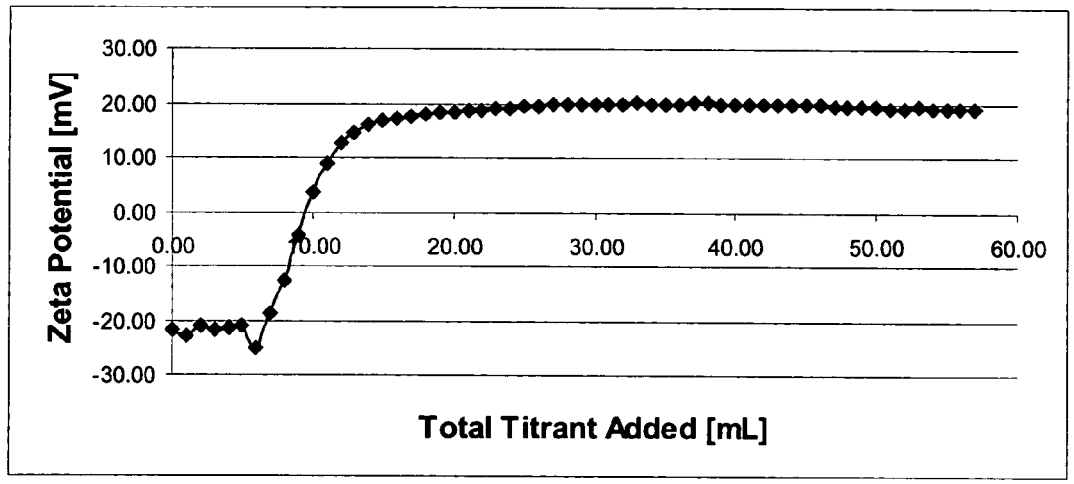
Figure 2C:
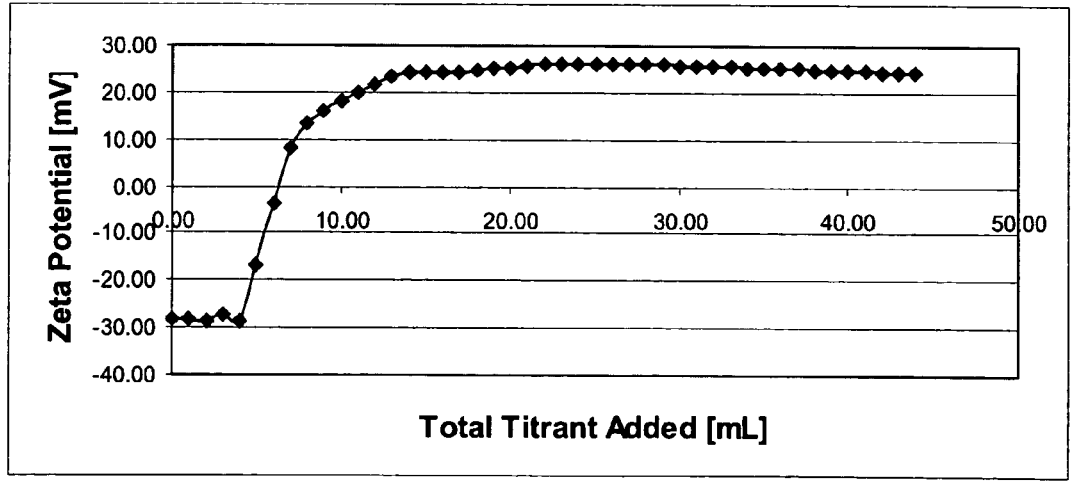

The magnitude of the final (or second) zeta potential for each titrated ink depended on the nature of the dispersion as well as the surfactant used. The results of the zeta potential titrations for each of the magenta, cyan, and yellow inks, with tetradecyltrimethylammonium bromide (TTAB) surfactant, are shown, respectively, in FIGS. 2A, 2B, and 2C.

The dispersion stability was evaluated for each ink. By way of example, in the case of the COJ260M ink titrated with TTAB, the dispersion was unstable in the zeta potential region between −20 and +20 mV (see FIG. 2A), but was stable once the ink had reached a positive plateau above +20 mV.

Control inks, using the same color pigments, as originally formulated (without going through reverse polarization), were also made. Both sets of inks (control inks, and reversed polarity inks having been titrated with TTAB) were filled in inkjet pens, P1 (control) and P2 (reversed polarity), respectively. Bleed performance for each combination of black ink having ADBP pigment, with each of the cyan, magenta, and yellow inks (both control and reversed polarity inks) was evaluated across a range of plain paper media, with the average results shown in Table I, below, with higher numbers indicating a higher (or worse) level of bleed performance based on a visual scale.

TABLE I

| Pen/ Ink | Ink Make Up[1] | | | Average Bleed Performance | | |
|---|---|---|---|---|---|---|
| | C | M | Y | K to C | K to M | K to Y |
| P1 | COJ250C | COJ260M | COJ270Y | 21 | 20 | 15 |
| P2 | COJ250C TTAB | COJ260M TTAB | COJ270Y TTAB | 8 | 6 | 7 |

Note[1]: The letters C, M, Y, and K, respectively, represent, cyan, magenta, yellow, and black.

As can be seen from the data in Table I, the level of bleed decreased significantly, when the polarity of the color inks were changed from a first polarity (or first charge) similar to that of the black, to a second polarity (or charge) opposite of that of the black ink.

As noted, earlier, similar performance may be obtained when using colorants (e.g. black, cyan, magenta, yellow) having a first anionic charge, wherein the black pigmented ink goes through reversal of polarity, i.e., second cationic charge.

Similarly, bleed performance may be enhanced when starting with colorants (e.g. black, cyan, magenta, yellow) having a first cationic charge, wherein either the black or the color (non-blacks) inks (but not both) go through reversal of polarity, e.g., second anionic charge.

Figure 3A:
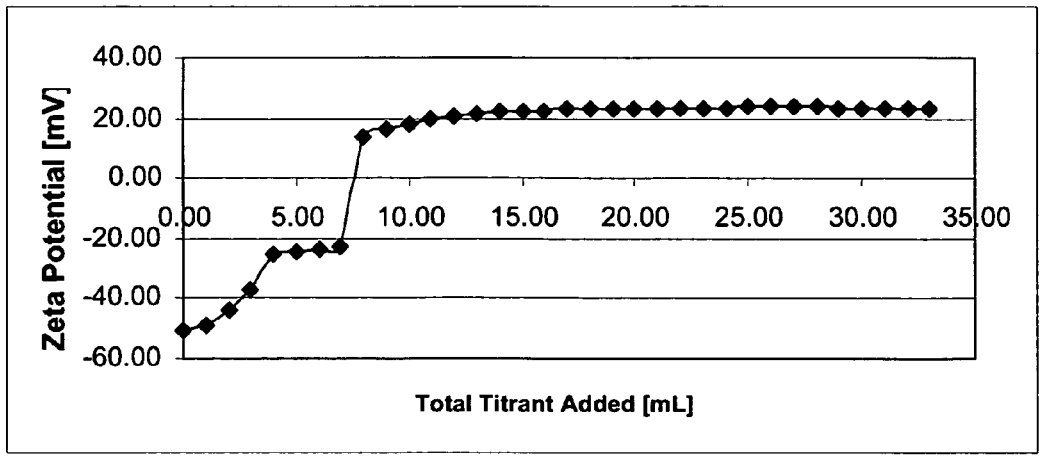
FIGS. 3A through 3C are graphical representations of the effect of various surfactants on zeta potential of magenta pigmented ink samples.
Figure 3B:
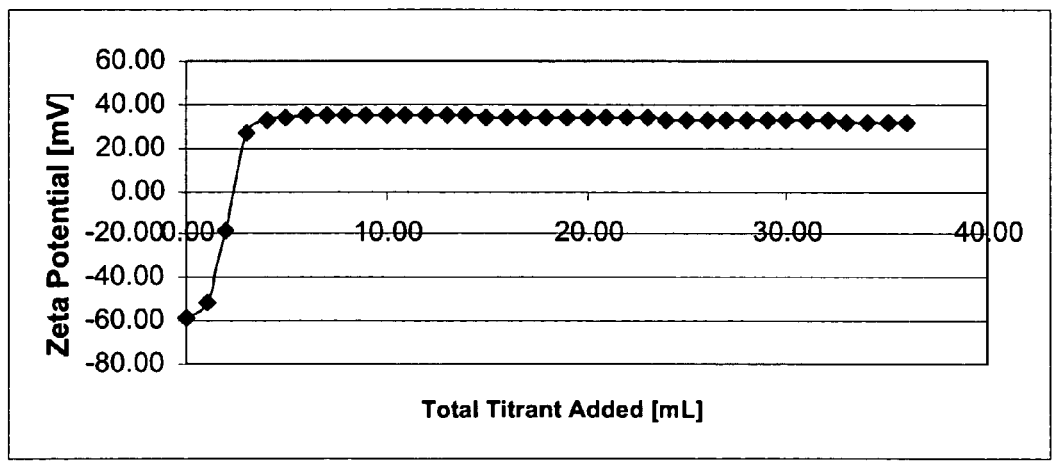
Figure 3C:
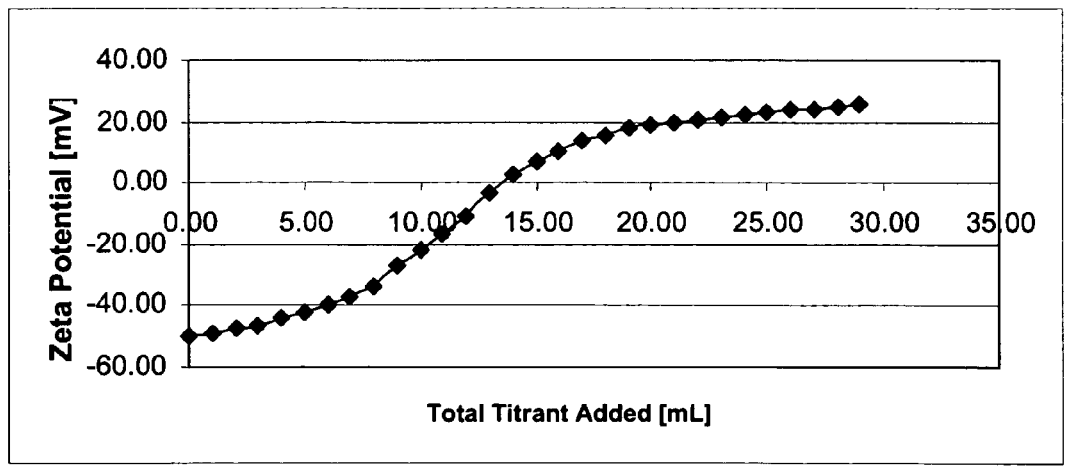
Figure 4A:
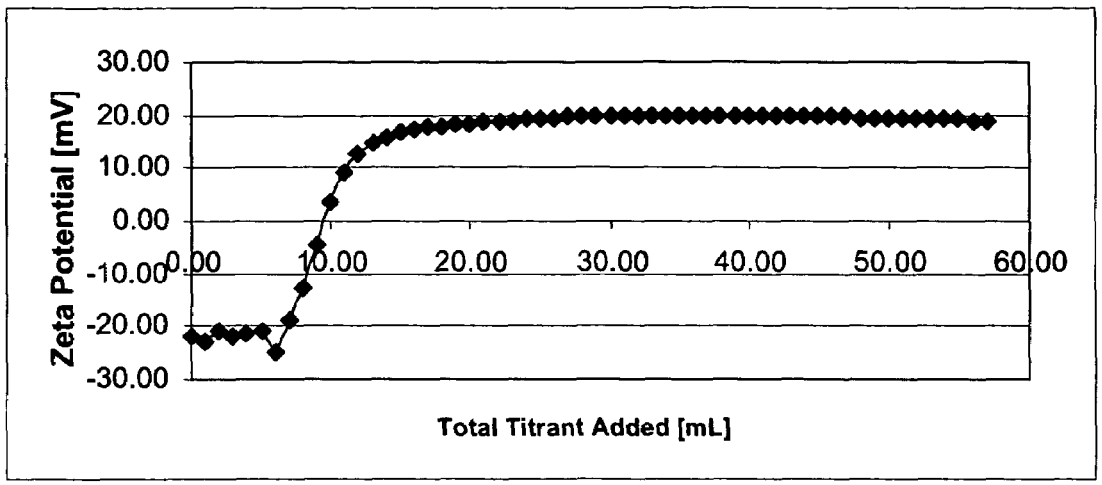
FIGS. 4A through 4C are graphical representations of the effect of various surfactants on zeta potential of cyan pigmented ink samples.
Figure 4B:
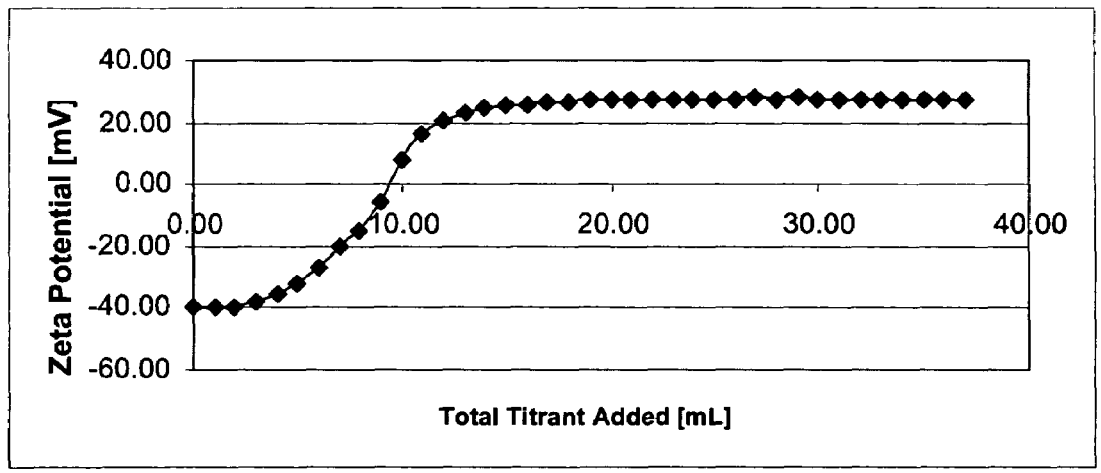
Figure 4C:
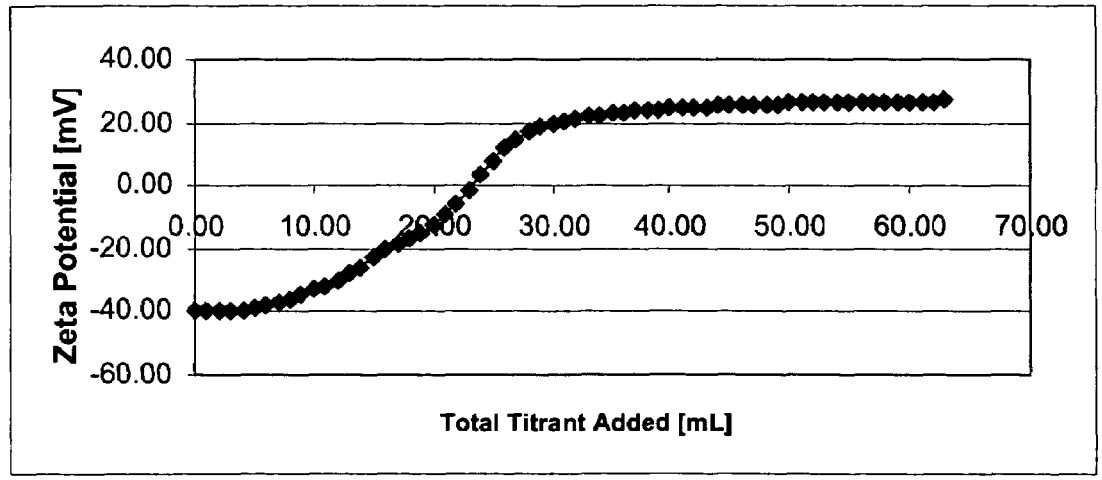
Figure 5A:
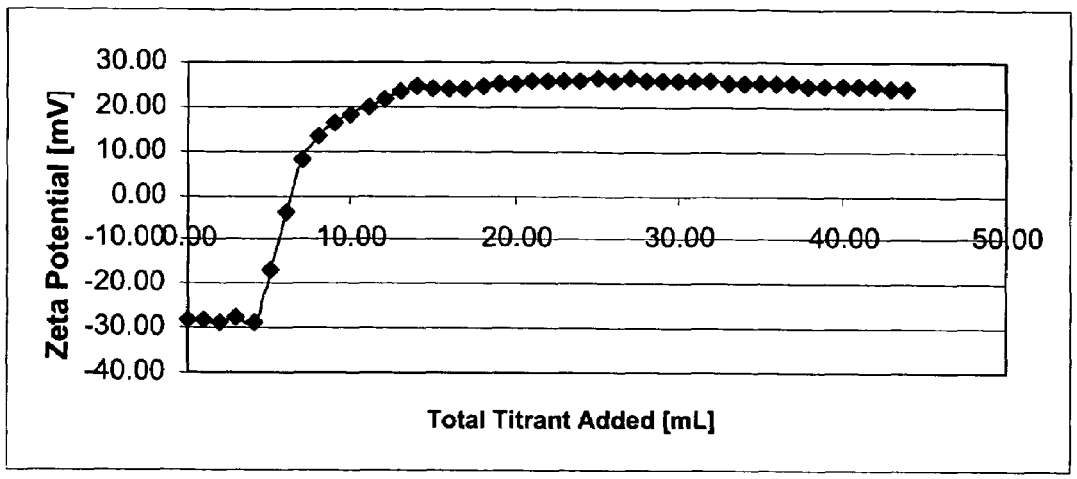
FIGS. 5A through 5C are graphical representations of the effect of various surfactants on zeta potential of yellow pigmented ink samples.
Figure 5B:
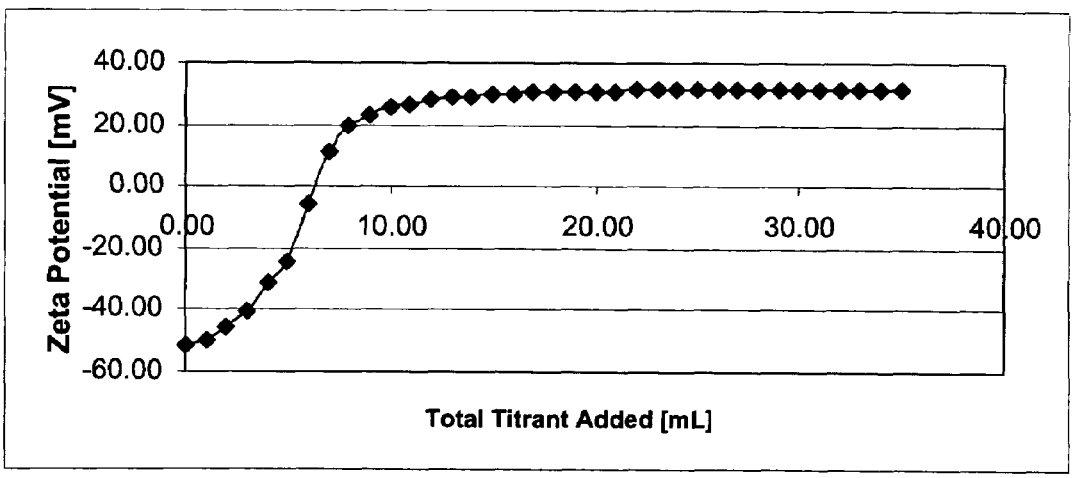
Figure 5C:
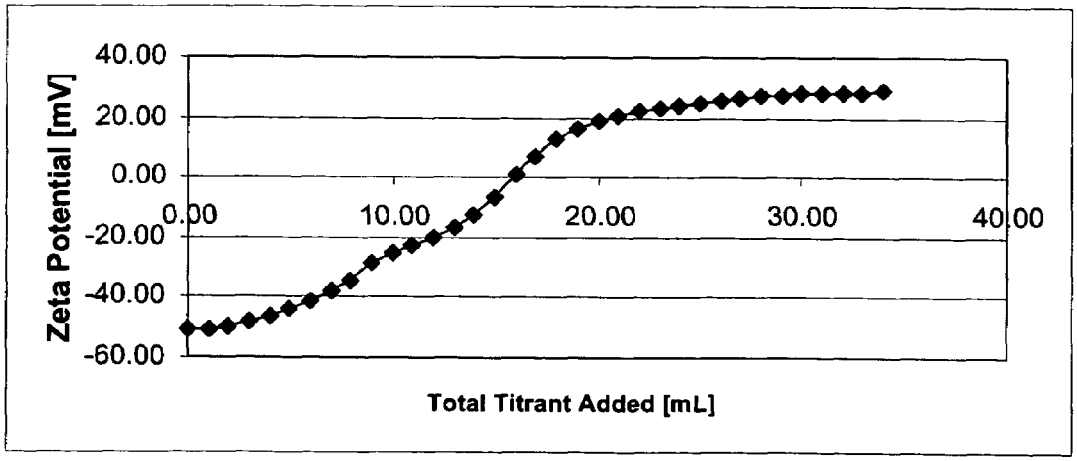

Similarly, FIGS. 3A-3C, illustrate the zeta potential titration curves for the magenta pigmented ink (COJ260M) with TTAB, CPC, and CTAC surfactants, respectively; while, FIGS. 4A-4C and 5A-5C, illustrate the zeta potential titration curves for the cyan (COJ250C) and yellow (COJ270Y) inks with the same surfactants TTAB, CPC, and CTA; respectively.

In yet another series of experiments, the bleed performance of the color inks magenta (COJ260M), cyan (COJ250C) and yellow (COJ270Y), was evaluated against self-dispersed black pigmented ink (COJ200K). As noted earlier, each of these inks (color as well as black) are, as originally formulated, anionically stabilized (first charge). The black ink was titrated with CPC surfactant, with an initial zeta potential of −57 mV and a final zeta potential after titration of +37 mV. The average bleed performance on HP Printing Paper ("HPPP"), a representative plain paper, is reported in Table II.

TABLE II

| | Ink Make Up | | | | Average Bleed Performance | | |
|---|---|---|---|---|---|---|---|
| Ink ID | K | C | M | Y | K to C | K to M | K to Y |
| P3 | COJ200 | COJ250C | COJ260M | COJ270Y | 33 | 28 | 32 |
| P4 | COJ200 | COJ250C + TTAB | COJ260M + TTAB | COJ270Y + TTAB | 19 | 17 | 19 |
| P5 | COJ200 + CPC | COJ250C | COJ260M | COJ270Y | 15 | 15 | 15 |

As can be noted from the data in Table II above, the bleed performance dramatically improves when the anionic black is used with cationically reversed color inks (P4) as compared to anionic black used with anionic (original) color inks (P3). Similarly, the bleed performance improves when the reversed polarity black (changed from anionic to cationic) is used with anionic (original) color inks (P5) as compared to P3.

While particular forms of the invention have been illustrated and described herein, it will be apparent that various modifications and improvements can be made to the invention. Moreover, individual features of embodiments of the invention may be shown in some drawings and not in others, but those skilled in the art will recognize that individual features of one embodiment of the invention can be combined with any or all the features of another embodiment. Accordingly, it is not intended that the invention be limited to the specific embodiments illustrated. It is intended that this invention to be defined by the scope of the appended claims as broadly as the prior art will permit.

What is claimed is:

1. An inkjet ink set, comprising:
   a. a plurality of inks including at least a first and a second ink, each ink comprising an aqueous vehicle;
   b. a first pigmented colorant dispersed in the first ink and having a pre-determined first polarity; and
   c. a second pigmented colorant being different than the first colorant and dispersed in the second ink and having a pre-determined second polarity opposite that of the first polarity of the first ink; said second ink initially having an initial polarity similar to that of the first ink and the second polarity is achieved by the addition of a surfactant to the second ink in sufficient amount to reverse the second ink's initial polarity from the initial polarity to the second polarity, said second ink having a first zeta potential at the initial polarity and a second zeta potential opposite that of the first zeta potential, wherein the first zeta potential goes through a zero point before reversing its path to the second zeta potential in a direction opposite that of the first polarity such that the difference between the first and second zeta potential is at least 40 mV, wherein at least one of the colorants of either the first or the second ink is substantially achromatic and the other is substantially chromatic.

2. An ink set according to claim 1, wherein the first ink includes a substantially achromatic pigment.

3. An ink set according to claim 1, wherein the second ink includes a substantially chromatic color pigment.

4. An ink set according to claim 1, wherein at least one of the pigmented colorants is a self dispersing pigment.

5. An ink set according to claim 1, wherein the pigmented colorants in both inks independently are associated with counterions selected from the group consisting of $Na^{30}$, $Li^+$, $K^+$, and $NH_4^+$.

6. An ink set according to claim 1, wherein the pigmented colorants in both inks are independently associated with counterions selected from the group consisting of acetate, formate, chloride, gluconate, succinate, tartrate, glularate, malonate, carboxylate, fumarate, malate, sebacate, adipate, stearate, oleate, laurate, benzoate, and citrate.

7. An ink set according to claim 1, wherein the ink including a substantially chromatic color pigment is one of cyan, magenta, or yellow.

8. An ink set according to claim 1, wherein the surfactant added to the second ink to reverse the polarity from a first to a second polarity is a primary surfactant added in an amount ranging from about 0.01 to about 5.0%; by weight, based on the total weight of the ink.

9. An ink set according to claim 1, wherein the surfactant added to the second ink to reverse the polarity from a first to a second polarity is a primary surfactant added in an amount ranging from about 0.2 to about 2.0; by weight, based on the total weight of the ink.

10. An ink set according to claim 1, wherein the surfactant added to the second ink to reverse the polarity from a first to a second polarity is a primary surfactant added in an amount ranging from about 0.4 to about 1.5%; by weight, based on the total weight of the ink.

11. An ink set according to claim 1, wherein the ink further comprises a secondary surfactant which will not interfere with the surfactant and is added in an amount ranging from about 0.01 to about 2.5%; by weight, based on the total weight of the ink.

12. A method for enhancing bleed performance using an inkjet printer, comprising:
   a. ejecting at least one drop of a first inkjet ink comprising a first pigmented colorant dispersed in the first ink and having a pre-determined first polarity, and;
   b. ejecting at least one drop of a second inkjet ink comprising a second pigmented colorant being different than the first colorant and dispersed in the second ink and having a pre-determined second polarity opposite that of the first polarity of the first ink, said second ink initially having an initial polarity similar to that of the first ink and the second polarity is achieved by the addition of a surfactant to the second ink in sufficient amount to reverse the ink's initial polarity from the initial polarity to the second polarity, said second ink having a first zeta potential at the initial polarity to the second zeta potential opposite that of the first zeta potential, wherein the first zeta potential goes through zero point before reversing its path to the second zeta potential in a direction opposite that of the first polarity such that the difference between the first and second zeta potential is at least 40 mV, and;
   wherein at least one of the colorants of either the first or the second ink is substantially achromatic and the other is substantially chromatic.

13. A method according to claim 12, wherein the surfactant added to the second ink to reverse the polarity from a first to a second polarity is a primary surfactant added in an amount ranging from about 0.01 to about 5.0%; by weight, based on the total weight of the ink.

14. A method according to claim 12, wherein the surfactant added to the second ink to reverse the polarity from a first to a second polarity is a primary surfactant added in a amount ranging from about 0.2 to about 2.0; by weight, based on the total weight of the ink.

15. A method according to claim 12, wherein the surfactant added to the second ink to reverse the polarity from a first to a second polarity is a primary surfactant added in an amount ranging from about 0.4 to about 1.5%; by weight, based on the total weight of the ink, 16. An inkjet ink set, comprising:
   a. a plurality of inks including at least a first and a second ink, each ink comprising an aqueous vehicle;
   b. a first pigmented substantially chromatic colorant dispersed in the first ink and having a pre-determined first polarity; and
   c. a second pigmented substantially achromatic colorant being different than the first colorant and dispersed in the second ink and having a pre-determined second polarity opposite that of the first polarity of the first ink; said second ink initially has an initial polarity similar to that of the first ink and the second polarity is achieved by the addition of a surfactant to the second ink in sufficient amount to reverse the second ink's initial polarity from the initial polarity to the second polarity.

17. An ink set according to claim 16, wherein the second ink has a first zeta potential at the initial polarity and a second zeta potential opposite that of the first zeta potential.

18. An ink set according to claim 17, wherein the first zeta potential goes through a zero point before reversing its path to the second zeta potential in a direction opposite that of the first polarity.

19. An ink set according to claim 18, wherein the difference between the first zeta potential and the second zeta potential is at least 40 mV.

20. An ink set according to claim 16, wherein at least one of the pigmented colorants is a self dispersing pigment.

21. An ink set according to claim 16, wherein the pigmented colorants in both inks independently are associated with counterions selected from the group consisting of $Na^+$, $Li^+$, $K^1$, and $NH_4^+$.

22. An ink set according to claim 16, wherein the pigmented colorants in both inks are independently associated with counterions selected from the group consisting of acetate, fonnate, chloride, gloconate, succinate, tartrate, glutarate, malonate, carboxylate, fumarate, malate, sebacate, adipate, stearate, oleate, laurate, benzoate, and citrate.

23. An ink set according to claim 16, wherein the ink including a substantially chromatic color pigment is one of cyan, magenta, or yellow.

24. An ink set according to claim 16, wherein the surfactant added to the second ink to reverse the polarity from a first to a second polarity is a primary surfactant added in an amount ranging from about 0.01 to about 5.0%; by weight, based on the total weight of the ink.

25. An ink set according to claim 16, wherein the surfactant added to the second ink to reverse the polarity from a first to a second polarity is a primary surfactant added in an amount ranging from about 0.2 to about 2.0; by weight, based on the total weight of the ink, 26. An ink set according to claim 16, wherein the surfactant added to the second ink to reverse the polarity from a first to a second polarity is a primary surfactant added in an amount ranging from about 0.4 to about 1.5%; by weight, based on the total weight of the ink.

27. An ink set according to claim 16, wherein the ink further comprises a secondary surfactant which will not interfere with the surfactant and is added in an amount ranging from about 0.01 to about 2.5%; by weight, based on the total weight of the ink.

* * * * *

UNITED STATES PATENT AND TRADEMARK OFFICE
CERTIFICATE OF CORRECTION

PATENT NO. : 7,479,180 B2
APPLICATION NO. : 11/412573
DATED : January 20, 2009
INVENTOR(S) : Sundar Vasudevan It is certified that error appears in the above-identified patent and that said Letters Patent is hereby corrected as shown below:

In column 3, line 61, delete "Monarchs 1000" and insert -- Monarch® 1000 --, therefor.

In column 3, line 64, delete "Chromophta®" and insert -- Chromophtal® --, therefor.

In column 5, line 41, after "TERGITOL®" delete "a".

In column 9, line 30, in Claim 1, after "mV," insert -- and --.

In column 9, line 42, in Claim 5, delete "Na$^{30}$," and insert -- Na$^+$, --, therefor.

In column 9, line 47, in Claim 6, delete "glularate," and insert -- glutarate, --, therefor.

In column 9, line 61, in Claim 9, delete "2.0;" and insert -- 2.0%; --, therefor.

In column 10, line 19, in Claim 12, after "reverse the" insert -- second --.

In column 10, line 21, in Claim 12, delete "to the" and insert -- and a --, therefor.

In column 10, line 23, in Claim 12, after "through" insert -- a --.

In column 10, line 38, in Claim 14, delete "in a" and insert -- in an --, therefor.

In column 10, line 39, in Claim 14, delete "2.0;" and insert -- 2.0%; --, therefor.

In column 10, line 45, in Claim 15, delete "ink," and insert -- ink. --, therefor.

In column 11, line 9, in Claim 21, delete "K$^1$," and insert -- K$^+$, --, therefor.

In column 11, line 13, in Claim 22, delete "fonnate," and insert -- formate, --, therefor.

In column 11, line 13, in Claim 22, delete "gloconate," and insert -- gluconate, --, therefor.

Signed and Sealed this

Twenty-second Day of June, 2010

David J. Kappos
*Director of the United States Patent and Trademark Office*

In column 11, line 15, in Claim 22, delete "Iaurate," and insert -- laurate, --, therefor.

In column 12, line 7, in Claim 25, delete "2.0;" and insert -- 2.0%; --, therefor.

In column 12, line 8, in Claim 25, delete "ink," and insert -- ink. --, therefor.